United States Patent [19]
Herbruck

[11] Patent Number: 5,214,411
[45] Date of Patent: May 25, 1993

[54] ULTRASONIC ANIMAL REPELLING APPARATUS

[76] Inventor: Steven L. Herbruck, 355 Dalton, Ventura, Calif. 93003

[21] Appl. No.: 790,519

[22] Filed: Nov. 12, 1991

[51] Int. Cl.$^5$ ............................................. G08B 21/00
[52] U.S. Cl. ..................... 340/573; 119/29; 119/174; 340/567; 367/138; 367/139
[58] Field of Search ................... 340/573, 567; 119/29, 119/174; 367/139, 138

[56] References Cited

U.S. PATENT DOCUMENTS

| | | | |
|---|---|---|---|
| 3,517,226 | 6/1970 | Jones, Sr. ............................. | 367/139 |
| 4,658,386 | 4/1987 | Morris ................................. | 367/139 |
| 4,689,776 | 8/1987 | Thorndyke et al. ................ | 367/139 |
| 5,015,994 | 5/1991 | Hoberman et al. ................. | 340/567 |

*Primary Examiner*—Glen R. Swann, III
*Attorney, Agent, or Firm*—Jack C. Munro

[57] ABSTRACT

An ultrasonic sound emitting apparatus produces an undesireable noise for animals such as dogs and cats to deter such animals from trespassing within certain geographical locations with this noise being of such a high frequency level that it is not heard by most human beings. The apparatus includes a housing with an ultrasonic emitter being mounted within a reflector cone formed within the front face of the housing. The sound emitter is moveable relative to the cone between a projected position and a retracted position and when in the retracted position the pattern of sound emitted is substantially wider than when the emitter is in the projected position. With the emitter in the projected position the pattern of sound emitted is of substantially greater length than the pattern of sound with the emitter in the retracted position. A sensor such as an infrared sensor is to be mounted within the front face of the housing which will cause activation of the emitter only upon an animal being detected.

3 Claims, 2 Drawing Sheets

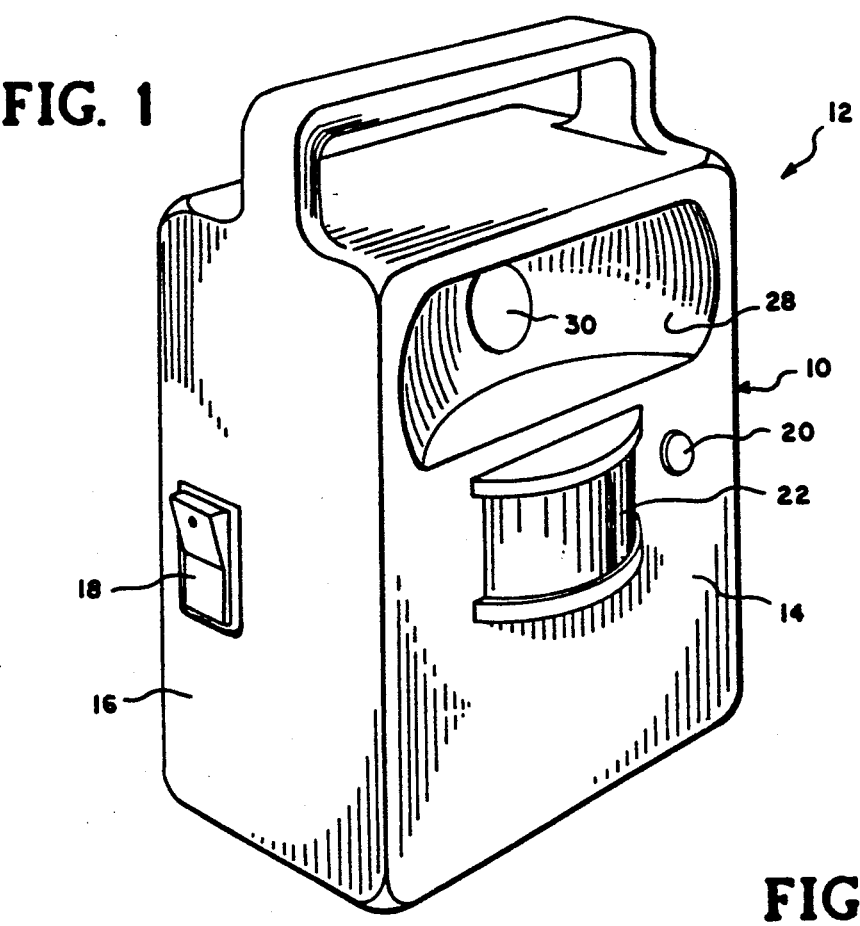
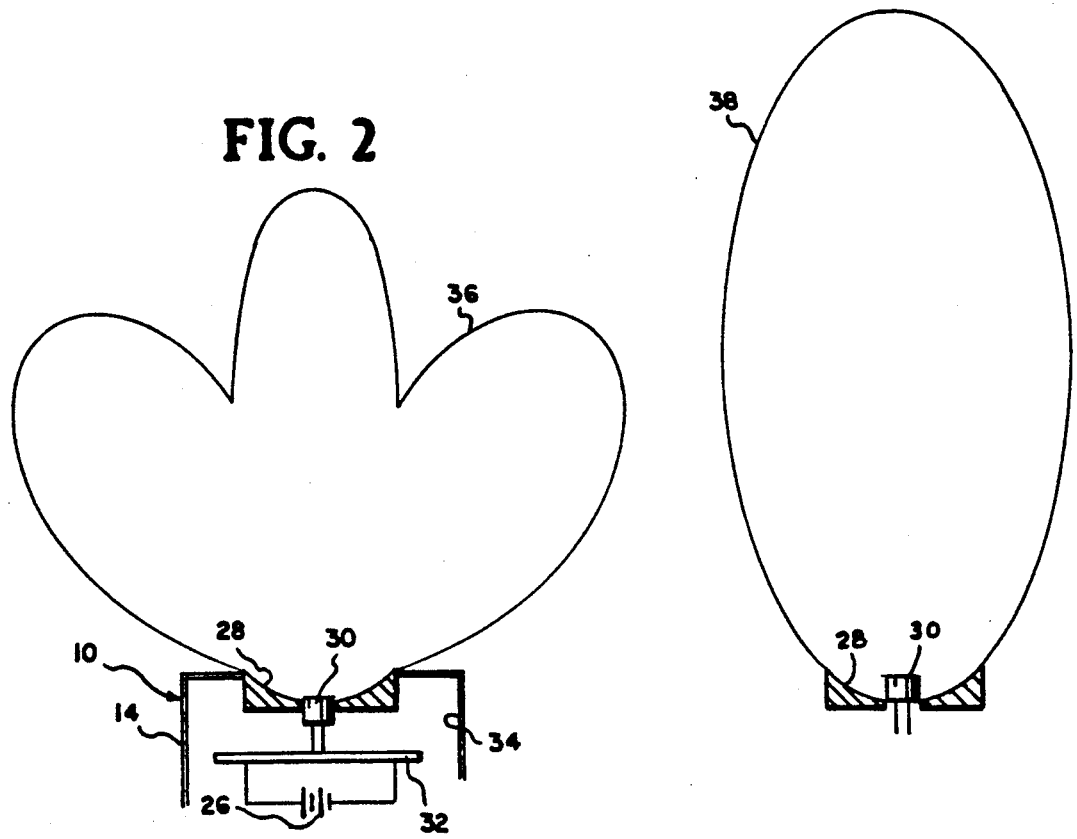

ULTRASONIC ANIMAL REPELLING APPARATUS

BACKGROUND OF THE INVENTION

1. Field of the Invention

The field of this invention relates to sound emitting apparatuses and more particularly to a sound emitting apparatus which is to be detectable only by animals to deter the animals from traversing certain locations such as a yard of a house.

2. Description of the Prior Art

Property owners have long experienced undesireable trespasses by animals. Both cats and dogs are known to deposit feces as well as urinate on the side of a house or upon certain plants which may cause the plants to actually die. It is difficult to prevent an unauthorized trespass of an animal on property. If a human being happens to be in the area of the trespass at the time it occurs, the human being can normally chase the animal away. However, most trespasses occur when the human being is not at the location.

In the past there has been attempts at formulating some type of a chemical which can be placed on the property which produces an odor which is undesireable to the animal. However, such chemicals have proved to be ineffective and may produce an undesireable odor for one animal and to another animal that odor is not undesireable. Another way in which to keep animals out of a certain property location is by way of a fence or a wall. However, fences and walls prove to be rather ineffective for cats. Plus fences and walls are a rather expensive structure just to prevent an animal from trespassing on property. Also, in many locations the placing of a wall or fence would be unattractive and not consistent with the adjacent environment.

Another way in the past to deter an animal's trespass has been to produce a sound which is undesireable to the animal. Animals such as dogs and cats are able to hear sounds in the ultrasonic range which is above the normal hearing range for a human being. Therefore, by emitting of a sound in the higher ranges at a sufficient loudness level, the animal will make a concerted effort to get away from that area to avoid hearing of that sound while at the same time a human being will not even be able perceive the sound. However, in the past, such devices have not been constructed to be too effective to operate over an extended period of time. The biggest problem with such devices has been the requirement for power. In the past, power has been supplied by means of a cord which essentially eliminates the aspect of portability to such a device. Plus the fact of having a cord laying around, assuming it is not buried in the ground, results in a rather unsightly appearance. In the past, it has not been known to construct an effective sound producing apparatus which is useable for an extended period of time and which carries with it its own power source and, therefore, is portable.

SUMMARY OF THE INVENTION

The sound producing apparatus of the present invention is designed to operate sporadically when an animal is detected by an infrared sensing detector. The detector is mounted on the front face of a housing. Also, mounted on the front face of the housing is a concavity which forms a sound reflector cone for emitted sound. Centrally mounted within this cone is a sound emitter with this sound emitter being movable between a projected position and a retracted position. Appropriate electronics and an appropriate battery source are included within the housing of the apparatus to cause the emitter to emit sound when a detector detects the presence of an animal within a certain close proximity. By varying the position of the emitter, the pattern of the sound emitted can be varied according to the location of use. With the emitter retracted, the sound is emitted in a shorter length and wide pattern. With the emitter in the projected position, the pattern is substantially narrower but longer then when the emitter is in the projected position.

The primary objective of the present invention is to construct an ultrasonic sound emitting apparatus to deter animals from making a trespass at a certain geographical location which is portable and can be easily and quickly moved from location to location and is capable of being used over an extended period of time before requiring replacement of the power source to operate the apparatus.

Another objective of the present invention is to construct a ultrasonic sound emitting apparatus that will deter trespassing of animals which can be constructed relatively inexpensive and therefore sold to the ultimate user at an inexpensive price.

BRIEF DESCRIPTION OF THE DRAWINGS

FIG. 1 is a perspective view of the housing utilized in conjunction with the sound emitting apparatus of the present invention showing clearly the front face of the housing within which is mounted the sound emitter and the detector that is used to cause activation of the emitter;

FIG. 2 is a schematic view depicting the pattern of the emitted sound with the emitter in the retracted position;

FIG. 3 is the pattern of the sound emitted from the emitter with the emitter in the projected position.

DETAILED DESCRIPTION OF THE SHOWN EMBODIMENT

Figure 4:
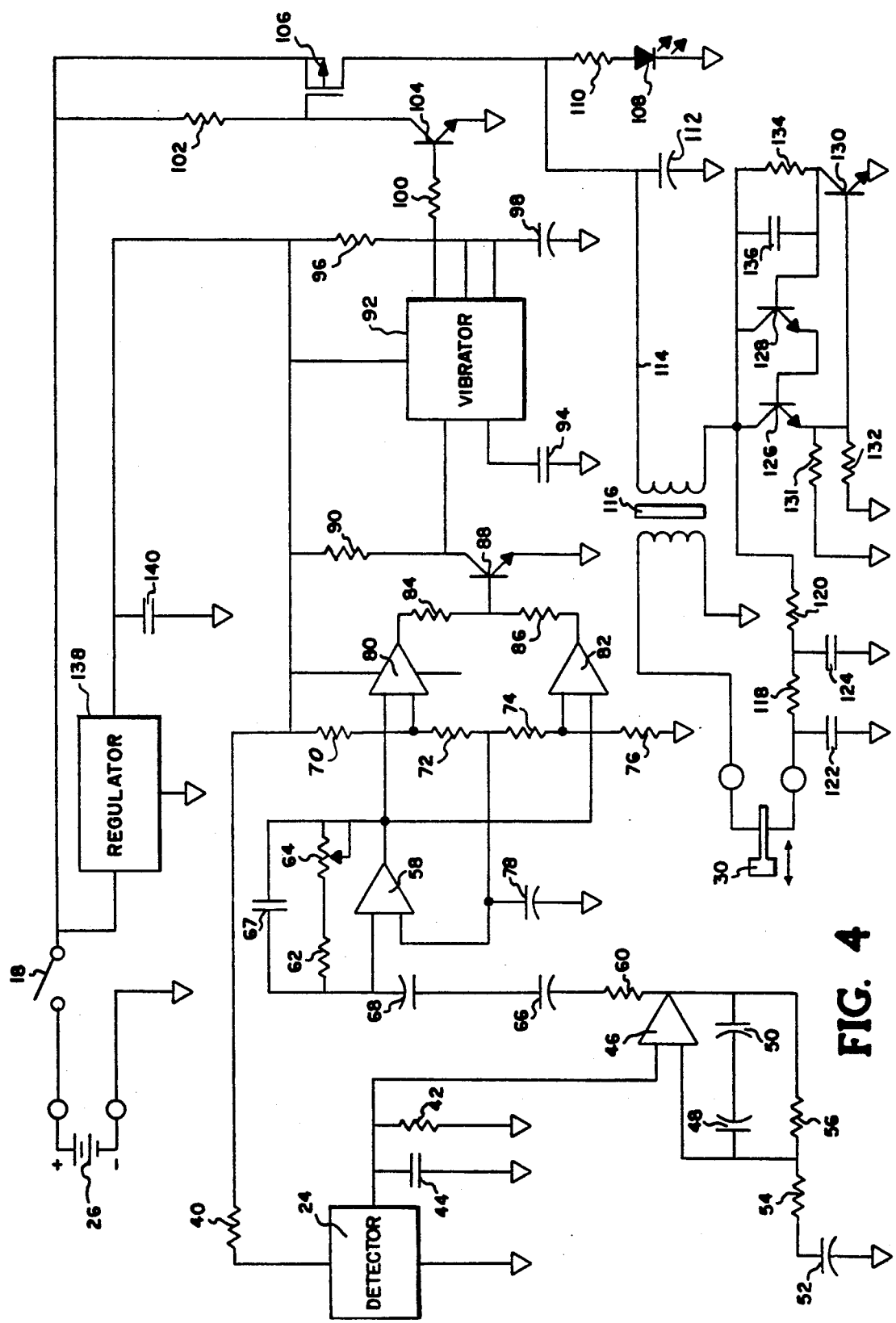
FIG. 4 is the electronic schematic with the circuitry utilized in conjunction with the apparatus of the present invention.

Referring particularly to the drawings, there is shown a rectangular box-like housing 10 which forms the exterior wall surface of the ultrasonic sound emitting apparatus 12 of this invention. The housing 10 includes a front face 14. Within the sidewall 16 there is mounted an on/off switch 18. Mounted within the front face 14 is a convex lens 22 with an infrared detector 24 being mounted interiorly thereof. Electrical power is supplied to the detector 24 and the light 20 as well as to the entire circuit by means of a battery 26.

The front face 14 also includes a concave recess 28 which forms a reflector horn for the emitted signal. Centrally mounted within the recess 28 is a ultrasonic emitter 30. The emitter 30 is electronically connected to a printed circuit board 32 which is mounted within the internal chamber 34 of the housing 10. The emitter 30 is to be movable between a retracted position shown in FIG. 2 to a projected position shown in FIG. 3. If the emitter 30 is in the retracted position as shown in FIG. 2, there is produced a wide muted field as represented generally by pattern 36. With the emitter 30 in the projected position shown in FIG. 3, the pattern 38 of the field can be generally termed a loud tight field. In actual practice the field in FIG. 2 will be between twenty and thirty feet wide and extend in length about fifteen feet from the emitter 30. In reference to FIG. 3, the field is about twenty five feet long and between ten and twenty feet wide. It is the intention to use the emitter in the position of FIG. 3 when it is desired to produce essentially a long narrow beam of noise to an animal. With the emitter 30 in the position of FIG. 2 the undesirable noise is to encompass a wider but shorter length area. For example, if the user wishes to project the noise across the front of one's yard at one's house, the user would be likely to use the emitter 30 in the position shown in FIG. 3 with the pattern 38 producing the maximum length. However, if the user wishes to pretty much cover a certain geographical area such as a portion of one's yard, the emitter 30 then would be in the position shown in FIG. 2 producing the pattern 36. What actually produces the patterns 36 and 38 is that the ultrasonic sound signal is emitted from the emitter 30 and is reflected from the reflector horn comprising the concave recess 28 which produces the shown shape of patterns 36 and 38 according to the position of the emitter 30.

It is to be understood that the emitter 30 will not be emitting continuously but will only be activated upon an animal being detected and this detection is accomplished by means of infrared detector 24. Such detectors are in common usage within a wide variety of electronic devices. The desireable type of detector 24 would be what is termed a pyroelectric infrared detector. The operating voltage of the detector 24 is determined by the ratio of the values of the resistors 40 and 42. In addition, resistor 42 has been selected to provide maximum detector sensitivity but minimum noise immunity, that is, electronic noise from the apparatus 12. Capacitor 44 is provided to decouple the electronic stray noise from the output of detector 24.

The non-inverting amplifier 46 is a passband filter when combined with capacitors 48, 50 and 52 and resistors 54 and 56. From the amplifier 46 there is created a narrow passband with theoretical corner frequencies at 0.318 Hertz and 0.338 Hertz. The amplifier 46 has a gain of 49.5 at 0.325 Hertz.

The output of the passband filter is transmitted to an inverting amplifier 58. The amplifier 58 is again another passband filter when combined with resistors 60, 62 and 64 and capacitors 66, 67 and 68. Resistor 64 is a variable resistor and a passband is created with theoretical corner frequencies at 0.318 Hertz and 1.51 Hertz when resistor 64 is at its maximum value and 1.68 Hertz when resistor 64 is at its minimum value. At 0.325 Hertz, amplifier 58 has a minimum gain of 1.43 and a maximum gain of 1.77. Furthermore, the amplifier 58 output is centered at 0.807 volts which is determined by the voltage dividing network composed of resistors 70, 72, 74 and 76. Capacitor 78 is large filter capacitor which keeps the center voltage stable. The combination of amplifiers 46 and 58 is a two-stage bandpass filter with corner frequencies of approximately 0.318 Hertz and 1.0 Hertz, and at 0.45 Hertz a minimum gain of 75.5 and a maximum gain of 93.3.

The network formed by voltage comparators 80 and 82 is a window comparator. It serves as the motion detector and its input is the output of the two-stage bandpass filter. The output of comparator 80 is zero volts until its input exceeds a reference voltage of 1.10 volts which is set by the voltage dividing network composed of resistors 70, 72, 74 and 76. When the input to comparator 80 exceeds 1.10 volts, its output becomes 3.5 volts. The output of comparator 82 is also zero volts until its input falls below the reference voltage of 0.512 volts which is again set by the voltage dividing network composed of resistors 70, 72, 74 and 76. When the input falls below the 0.512 reference voltage, the output of the comparator 82 also becomes 3.5 volts.

The window comparator's output is inverted by way of the transistor inverted circuit composed of resistors 84 and 86, transistor 88 and resistor 90. The output of this transistor inverter circuit is the output of what is to be called the sensor/detector subcircuit.

When a relatively slow-moving infrared emitting body (animal) enters, leaves or continues moving within the detection field of the infrared sensor 24, the output of the sensor/detector subcircuit will start and continue shifting levels between 3.5 volts and zero volts and then back to 3.5 volts. This level shifting will continue until the motion has ceased.

The output of the window comparator composed of comparators 80 and 82 is connected to the input trigger of a monostable vibrator 92 operating in the retriggerable one-shot mode. Capacitor 94 lessens the likelihood of spurious triggering of the one-shot mode. The duration of a single 3.5 volt output pulse is determined by resistor 96 and capacitor 98. Resistors 100 and 102 along with transistor 104 form an inverter allowing P-channel MOSFET 106 to be correctly biased. MOSFET 106 comprises a field effect transistor.

The trigger subcircuit one-shot is triggered or retriggered by transitions on its input. The output, a pulse of at least three seconds duration, is inverted and drives the field effect transistor 106 allowing it to pass current supplied by a voltage of six volts from the battery 26.

The field effect transistor 106 passes current to the oscillator subcircuit which includes light emitting diode 108. The light emitting diode 108 is energized with resistor 110 which determines the brightness of the diode 108. The capacitor 112 is a filter capacitor which attenuates alternating current on the power supply line 114 of the transformer 116. The transformer 116 is tuned to 21.8 kilohertz by the network formed by resistors 118 and 120 and by capacitors 122 and 124. The ultrasonic emitter 30 is driven by the signal coupled through transformer 116. The transformer 116 is driven by the network composed of transistors 126, 128 and 130 and resistors 131, 132 and 134 and capacitor 136. The transformer's winding ratio is such that the sound emitter 30, which comprises an ultrasonic piezo, creates an optimized sound pressure level of approximately one hundred and ten decibels at one meter spaced from the emitter 30. When the oscillator subcircuit is energized, the light emitting diode 108 illuminates forming indicator light 20 and the ultrasonic transducer emits a loud ultrasonic tone.

The power supply subcircuit is composed of battery 26 which is connected through the switch 18 through linear voltage regulator 138. The output of the regulator 138 is 3.5 volts. The capacitor 140 is present on the output side of the linear voltage regulator 138 to decouple stray noise to ground. When switch 18 is closed, 3.5 volts is supplied to the sensor/detector and trigger subcircuits and the voltage of the battery 26 is connected to the trigger subcircuit.

The battery 26 comprises a single commercially available low voltage battery. The switch 18 allows the user to completely shut off the circuit. The circuit has been designed so as to maximize battery's life with a quiescent supply current of approximately 1.25 milliamps and an active drain of approximately 125 milliamps.

The housing 10 is housed in a compact and rugged utility case providing for outdoor operation under all but the most severe conditions. The ultrasonic emitter is centrally mounted within the recess 28 which forms the reflector cone for the emitted signal. This recess 28 is formed as part of the housing 10.

Numeral 22 as shown in FIG. 1 is actually the focusing lens placed over the infrared detector 24. The lens 22 increases the field of detection so as to coincide roughly with that of the field of the emitter 30. The indicator 20 becomes energized simultaneously with the emission of the ultrasonic tone from the emitter 30.

The apparatus 12 of this invention is designed to detect changes of infrared radiation incident upon the front wall 14 originating within a predetermined window as caused by natural movements of warm-blooded animals. The detection will cause a relatively loud ultrasonic tone to be emitted for approximately three seconds thereby annoying most animals and cause such to vacate the area of the detection window. Further movements detected during the three second interval result in a resetting of the three second time period which will keep the tone essentially emitted constant during the duration of detectable movements.

What is claimed is:

1. An ultrasonic sound emitting apparatus comprising:
    a housing having an internal chamber, said housing having a front face, said front face of said housing including a reflector cone, an ultrasonic emitter being mounted within said reflector cone, said reflector cone comprising a concave recess formed within said front face, said ultrasonic emitter being centrally mounted within said concave recess;
    sound emitting electronics mounted within said internal chamber, said sound emitting electronics including said ultrasonic emitter for emitting ultrasonic sound, said ultrasonic emitter producing a pattern of projected sound waves spaced forward of said front face; and
    a detector mounted in said front face, said detector being connected to said sound emitting electronics, said ultrasonic emitter normally being deactivated with activation to occur upon said detector's sensing the presence of an animal in close proximity of said housing,
    said ultrasonic emitter being movable between an inward position and an outward position within said concave recess, said outward position locating said ultrasonic emitter in an outwardly projected position relative to said concave recess, and said inward position locating said ultrasonic emitter in a retracted position relative to said concave recess.

2. The apparatus as defined in claim 1 wherein:
    with said emitter in said projected position, said emitter produces a loud tight field forward of said front face and with said emitter in said retracted position, said emitter produces a wide, muted field forward of said front face.

3. The apparatus as defined in claim 2 wherein:
    said detector comprises an infrared detector.

* * * * *